United States Patent
Bhardwaj et al.

(10) Patent No.: US 12,307,204 B2
(45) Date of Patent: *May 20, 2025

(54) SYSTEMS AND METHODS FOR CONTEXTUALIZED AND QUANTIZED SOFT PROMPTS FOR NATURAL LANGUAGE UNDERSTANDING

(71) Applicant: Salesforce, Inc., San Francisco, CA (US)

(72) Inventors: Rishabh Bhardwaj, Singapore (SG); Amrita Saha, Singapore (SG); Chu Hong Hoi, Singapore (SG)

(73) Assignee: Salesforce, Inc., San Francisco, CA (US)

( * ) Notice: Subject to any disclaimer, the term of this patent is extended or adjusted under 35 U.S.C. 154(b) by 385 days.

This patent is subject to a terminal disclaimer.

(21) Appl. No.: 17/889,175

(22) Filed: Aug. 16, 2022

(65) Prior Publication Data

US 2023/0342559 A1 Oct. 26, 2023

Related U.S. Application Data

(60) Provisional application No. 63/363,524, filed on Apr. 25, 2022.

(51) Int. Cl.
*G06F 40/40* (2020.01)
*G06F 40/12* (2020.01)
(Continued)

(52) U.S. Cl.
CPC ............ *G06F 40/284* (2020.01); *G06F 40/12* (2020.01); *G06F 40/289* (2020.01); *G06F 40/40* (2020.01); *G06N 20/00* (2019.01)

(58) Field of Classification Search
USPC ................................................ 704/7–10, 257
See application file for complete search history.

(56) References Cited

U.S. PATENT DOCUMENTS 12,106,318 B1 * 10/2024 Chiang ................ G06Q 30/016
2022/0198144 A1 6/2022 Yang
(Continued)

OTHER PUBLICATIONS

Angelidis, Stefanos, et al. "Extractive opinion summarization in quantized transformer spaces." Transactions of the Association for Computational Linguistics 9 (2021 ): 277-293. (Year: 2021).
(Continued)

*Primary Examiner* — Leonard Saint-Cyr
(74) *Attorney, Agent, or Firm* — Haynes and Boone, LLP

(57) ABSTRACT

Embodiments described herein provide a soft prompt tuning technique referred to as the Vector quantized Input-contextualized Prompt (VIP). The VIP techniques has two integral properties i) instead of learning a fixed set of prompt tokens irrespective of the input, it generates a contextualized version of the soft prompts, conditional on the input text ii) it further passes the input-contextualized prompt tokens through a quantization network, inspired by Vector Quantized Transformers. The quantization network uses nearest neighbor search over a learnable codebook to train a discrete latent variable model over the prompt-space, thus generating quantized version of contextual prompt tokens. These quantized contextual prompt tokens are finally fed into the frozen language model along with the original input text.

20 Claims, 11 Drawing Sheets

(51) Int. Cl.
  *G06F 40/284* (2020.01)
  *G06F 40/289* (2020.01)
  *G06N 20/00* (2019.01)

(56) References Cited

U.S. PATENT DOCUMENTS

| | | |
|---|---|---|
| 2023/0325725 A1 | 10/2023 | Lester |
| 2024/0020546 A1 | 1/2024 | Vu |
| 2024/0095534 A1 | 3/2024 | Anandkumar |
| 2024/0112088 A1* | 4/2024 | Yu .................. G06N 3/0455 |
| 2024/0185035 A1* | 6/2024 | Yu .................. G06N 3/0455 |

OTHER PUBLICATIONS

Lester, Brian, Rami Al-Rfou, and Noah Constant. "The power of scale for parameter-efficient prompt tuning." arXiv preprint arXiv: 2104.08691 (2021 ). (Year: 2021).

Roy, Aurko, et al. "Theory and experiments on vector quantized autoencoders." arXiv preprint arXiv: 1805.11063 (2018). (Year: 2018).

Van Den Oord, Aaron, and Oriol Vinyals. "Neural discrete representation learning." Advances in neural information processing systems 30 (2017). (Year: 2017).

* cited by examiner

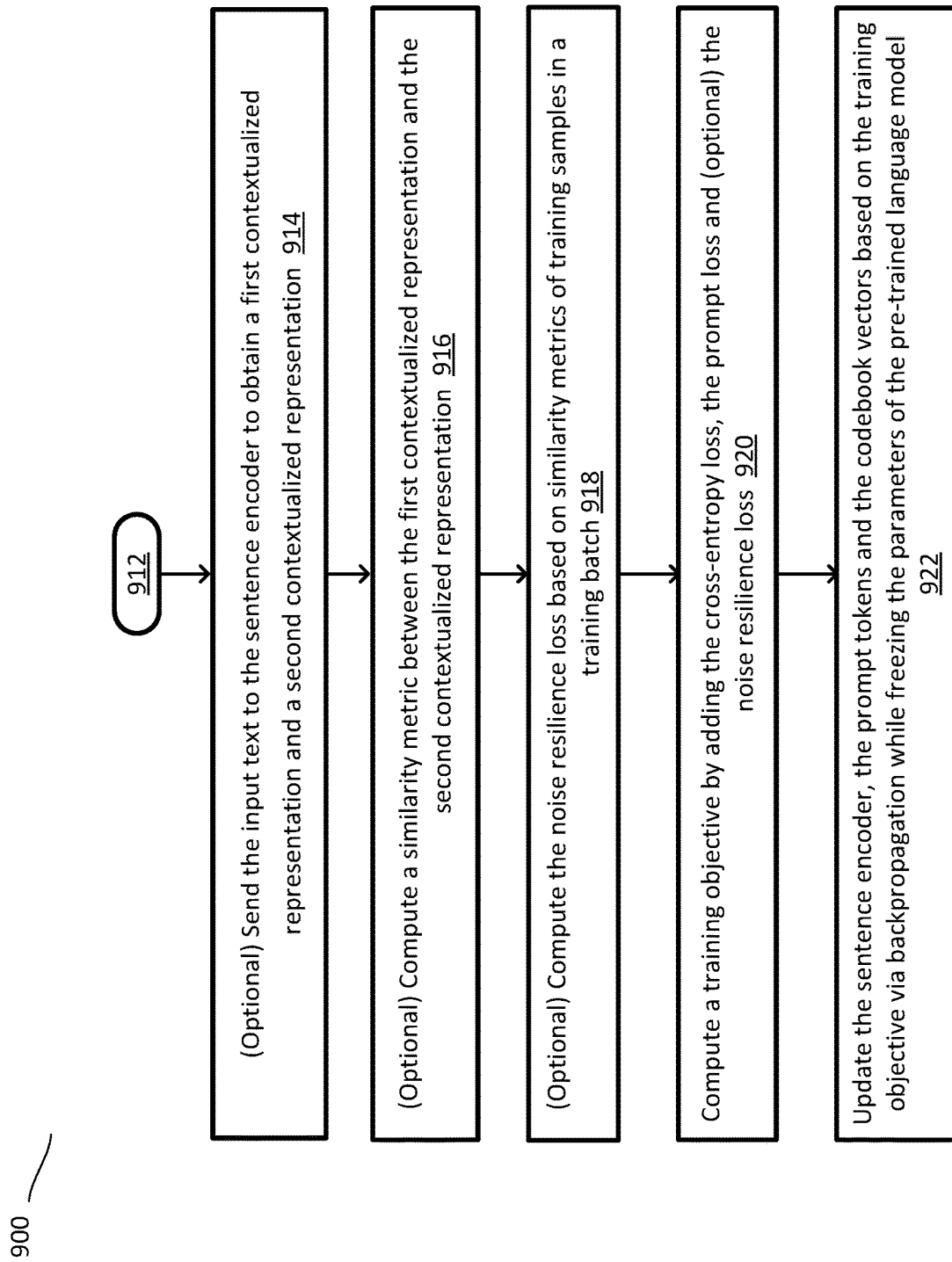
FIG. 9 (Cont')

| Model | CB acc./F1 | COPA acc. | WSC acc. | RTE acc. | WiC acc. | BoolQ acc. | MultiRC EM/F1a | ReCoRD EM/F1 | Avg. |
|---|---|---|---|---|---|---|---|---|---|
| FT | 92.9 | 57 | 63.5 | 78.1 | 71.9 | 79.8 | 77.6 | 72.3 | 74.2 |
| Adp | 92.7 | 56.7 | 65.6 | 79.1 | 68.9 | 79.3 | 77.7 | 70.2 | 73.8 |
| PT | 75.8 | 59 | 66.7 | 70.8 | 67.4 | 69.3 | 69.6 | 63.3 | 67.7 |
| VIP-IDP | 37.6 | 53 | 66.7 | 49.8 | 61.2 | 62.6 | 52.8 | 18.2 | 57 |
| VIP-C | 73.4 | 57 | 65.1 | 70.9 | 65.4 | 69.2 | 69.7 | 63.7 | 66.7 |
| VIP | 75.5 | 62.7 | 68.7 | 72.1 | 68 | 69.6 | 70.5 | 65.2 | 69.1 |

*FIG. 10*

| Model | Rel. classification | | NER | NLI |
|---|---|---|---|---|
| | SemEval F1a | TACRED F1a | CoNLL F1a | ANLI F1 |
| FT | 84.8 | 87.7 | 90.2 | 49.8 |
| Adp | 84.4 | 85.8 | 89.9 | 47.7 |
| PT | 70.9 | 83.5 | 87.1 | 41.6 |
| VIP-IDP | 68.95 | 70 | 87.2 | 29.8 |
| VIP-C | 71.8 | 83.6 | 87 | 39.3 |
| VIP | 72.4 | 84.4 | 87.4 | 43.2 |

*FIG. 11*

| Model | SQuAD | NewsQA | TriviaQA | SearchQA | HotpotQA | Nat. QA | RACE-M |
|---|---|---|---|---|---|---|---|
| FT | 83.2 | 65.6 | 80.7 | 77 | 61.6 | 71.1 | 73.6 |
| Adapter | 81.4 | 63.9 | 79.3 | 75.1 | 60.1 | 71.6 | 69.9 |
| PT | 77.5 | 59.3 | 53.4 | 77.6 | 72.9 | 69.6 | 63.4 |
| VIP-IDP | 73.9 | 55.6 | 14.8 | 71.5 | 62.5 | 64.4 | 50.5 |
| VIP-C | 77.8 | 59.6 | 52.3 | 77.6 | 73.1 | 68.5 | 62.5 |
| VIP | 78.7 | 61.1 | 53.9 | 77.9 | 73.5 | 69.7 | 65.9 |

*FIG. 12*

| Train domain | Test domain Results in form of {F1-PT(F1-VIP)} | | | | | | | |
|---|---|---|---|---|---|---|---|---|
| | BioASQ | DROP | DuoRC | RACE | RE | TextbookQA | Avg. |
| SQuAD | 54.3 (54.7) | 29 (34.4) | 35.9 (35.1) | 42.6 (40.4) | 78.7 (80) | 20.8 (16.6) | 48.9 (49.3) |
| NewsQA | 50.9 (49.4) | 24.9 (25.5) | 36.7 (36.9) | 39.4 (39.6) | 73.7 (73) | 38 (37.6) | 48.8 (48.4) |
| TriviaQA | 43.2 (46.5) | 17.1 (18.1) | 29.4 (29.5) | 27.6 (29.3) | 55.5 (54.1) | 27.7 (29.7) | 37.2 (37.9) |
| SearchQA | 42.9 (48.3) | 19 (24.3) | 27.5 (26.4) | 21.9 (17.8) | 58.9 (56.8) | 29.8 (32.7) | 38.1 (39.2) |
| HotpotQA | 54.1 (53.9) | 33.6 (34.2) | 33.7 (35.0) | 36.0 (37.2) | 79.1 (80.0) | 21.1 (23.5) | 49 (50) |
| Nat. QA | 52.7 (52.3) | 29.2 (31.8) | 29.8 (30.5) | 35.3 (32.8) | 75.8 (77.5) | 27.7 (28.3) | 47.4 (48.3) |

*FIG. 13*

| Model | CB acc./F1 | AXB acc. | AXG acc. | SNLI F1 | RTE acc. |
|---|---|---|---|---|---|
| PT | 43.1 | 63.8 | 49.9 | 62.6 | 70.2 |
| VIP | 59.7 | 66.1 | 51.9 | 66.7 | 71.8 |

FIG. 14

| Model | ANLI | RTE | TACRED | SemEval | ReCoRD | RACE-M | SQuAD | TriviaQA | NewsQA | SearchQA | HotpotQA | Nat. QA | Avg. |
|---|---|---|---|---|---|---|---|---|---|---|---|---|---|
| PT | 27.5 | 60.3 | 81.7 | 72.6 | 53.3 | 57.7 | 76.1 | 48.7 | 57 | 73.8 | 69.1 | 64.7 | 61.9 |
| VIP | 30.6 | 62.5 | 80.9 | 72.9 | 55.3 | 57.9 | 76.1 | 48.4 | 57.9 | 74.2 | 69.7 | 64.8 | 62.6 |

FIG. 15

SYSTEMS AND METHODS FOR CONTEXTUALIZED AND QUANTIZED SOFT PROMPTS FOR NATURAL LANGUAGE UNDERSTANDING

CROSS REFERENCE(S)

This application is a nonprovisional of and claims priority under 35 U.S.C. 119 to U.S. provisional application No. 63/363,524, filed Apr. 25, 2022, which is hereby expressly incorporated by reference herein in its entirety.

This application is related to U.S. nonprovisional application Ser. No. 17/889,178, filed on Aug. 16, 2022, now U.S. Pat. No. 12,147,765, which is hereby expressly incorporated by reference herein in its entirety.

TECHNICAL FIELD

The embodiments relate generally to natural language processing and machine learning systems, and more specifically to systems and methods for vector-quantized and input-contextualized soft prompts for natural language understanding.

BACKGROUND

Language models may be based on a neural network and trained to perform various natural language tasks. Prompt tuning has been largely successful as a parameter-efficient method of conditioning large-scale pre-trained language models to perform downstream tasks. Existing systems often employ a fixed set of task-specific continuous vectors, i.e., soft tokens that remain static across the task sample. For example, for the task of intent classification, the prompt may take a form as "the intent of the sentence is {intent}." Such a fixed prompt, however, may not generalize well to the diverse kinds of inputs the task comprises.

Therefore, there is a need to improve prompt performance in natural language understanding.

BRIEF DESCRIPTION OF THE DRAWINGS

FIGS. 10-15 are example data performance charts illustrating performance of the VIP tuning system, according to some embodiments described herein.

Figure 1:
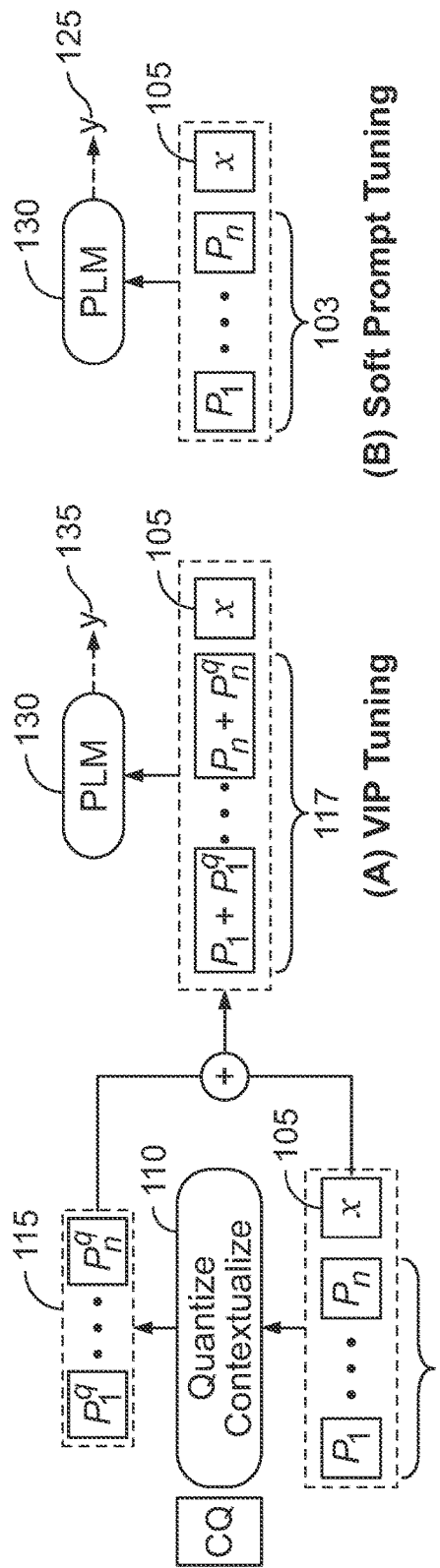
FIG. 1 is a simplified diagram illustrating a vector-quantized and input-contextualized prompt (VIP) tuning system in FIG. 1(A) compared with a traditional baseline soft prompt tuning system shown in FIG. 1(B) according to embodiments described herein.

In the figures, elements having the same designations have the same or similar functions.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Existing systems adopt prompt-based learning for manipulating the behaviour of language models to predict the desired output. Prompt-based learning is used to find the task-specific template that modifies the input with the objective of conditioning and guiding the language model towards generating the correct output. Most existing prompt-based learning involves manually designed templates to solve natural language processing (NLP) tasks, which limits the efficiency of the learning mechanism.

To relax the human efforts required in finding appropriate task and language model-specific template, some learning systems automate the process of prompt designing. For example, some systems may search for templates in the discrete space of token embedding, referred to as hard prompts. For example, for the task of intent classification, the prompt may take a form as "the intent of the sentence is {intent}." Other learning systems may find prompt tokens in the continuous vector space, referred to as soft prompts. These soft tokens may remain fixed across the task samples, referred to as static tokens. These static soft tokens may not generalize well to the diverse types of inputs the task may entail.

Embodiments described herein provide a soft prompt tuning technique which attends and adapts the prompt tokens to the input to provide more flexibility to the system to find the distribution of prompts that generalizes well to diverse forms of the input. Specifically, soft token prompts are first "contextualized" by a transformer-based sentence encoder that generates input-adapted prompt tokens from the input text and static soft prompts. The input adapted-prompt tokens, i.e., the contextual prompt representations from the sentence encoder, are then "quantized" to reduce the noise. The quantizer maintains a set of vectors, i.e., codebook, which is used to discretize the continuous space of contextualized prompts, thus allowing us to control its representational capacity. The quantization maps each contextual prompt token to the codebook. These mapped vectors are used as the final quantized prompts, with the codebook acting as a parametric discrete latent variable model over the contextual prompt space.

Next, the original input text is concatenated with the obtained quantized contextual prompt tokens and subsequently fed into the frozen pre-trained language model (PLM). The contextualize (e.g., the sentence encoder) and static tokens may be updated using backpropagation to minimize the task-specific prediction loss.

In one implementation, the codebook vectors may be updated using a more stable update method of exponential moving average.

In this way, instead of learning a fixed set of prompt tokens irrespective of the input, the quantized and contextualized soft prompt framework generates a contextualized version of the soft prompts, conditional on the input text. Such framework further passes the input-contextualized prompt tokens through a quantization network, which limits the space of contextual prompts based on the representation capacity of the codebook vectors.

System Overview

FIG. 1 is a simplified diagram illustrating a vector-quantized and input-contextualized prompt (VIP) tuning system in FIG. 1(A) compared with a traditional baseline soft prompt tuning system shown in FIG. 1(B) according to embodiments described herein. FIG. 1 shows that in both (A) and (B), soft token prompts 103 are used to fine tune the PLM 130 in different manners.

Specifically, for a given input x 105, assuming all the target tasks are conducted in a text-to-text format, tasks such as text and relation classification are reformulated as text generation and the model is expected to generate the class label y 135. Given a pretrained Language Model (PLM) 135 parameterized by $\theta$, a task T may be formulated as conditional text generation $Pr_\theta(Y|X)$ where X and Y are respectively the sequences of token embeddings corresponding to the input texts x 105 and output label y 135, generated by the tokenizer provided by the frozen PLM 135.

In the traditional soft prompt tuning system in FIG. 1(B), the input tokens X is prepended with a set of learnable soft tokens 103 P={$p_1$, ..., $p_n$}. Soft tokens $p_i$ 103 are vectors that lie in a d-dimensional continuous space $\mathbb{R}^d$. In this way, the model output Y 135 is conditioned directly on P and X as $Pr_\theta(Y|X)$, where the static vectors in P are conditionally independent of X given task $\mathcal{T}$, i.e. $P_r(P|X, T)=P_r(P|T)$, where T denotes the set of tokens obtained from task-specific attributes such as task description and class labels. In this way, the soft tokens $p_i$ 103 can be updated based on a training objective comparing the predicted model output label y and a ground-truth label associated with the input x, e.g., cross-entropy loss, via backpropagation, while freezing the PLM 130. However, such a setting restricts the system to find a singular static set of prompt tokens that is effective for all the diverse samples of a given task.

The VIP tuning system shown at FIG. 1(A) takes advantage of dependence of prompt on input X 105 to generalize over the unseen in and out-of-domain samples. At VIP tuning system, a quantization and contextualization (QC) module 110 contextualizes and quantizes the standard soft tokens 103 to generate prompt representations 115 that can encode task-specific information and contextual information from each of the samples. Specifically, the resulting VIP soft prompt tokens 105, denoted by the set of vectors $P^q=\{p_1^q, \ldots, p_n^q\} \in \mathbb{R}^d$, which unlike static tokens 103 P, hold the desired property $P_r(P|X, T) \neq P_r(P|T)$. The quantized tokens 115 are then added to the soft token residual 103. The processed soft tokens 117 are then prepended to the input x 105 before inputting to the PLM 130 to generate a predicted output label y 135.

Specifically, in order to obtain input-dependent soft prompts $P^q$, trainable static prompt tokens P along with the original input token sequence X is fed to a parameterized submodule 110, which performs contextualization and quantization. The contextualization and quantization (CQ) submodule 110 generates $P^q=CQ_\varnothing([P,X])$ 115 where $\varnothing$ is the parameter set of CQ module 110. The final prompt token representation 117 is obtained by combining the CQ module's output $P^q$ 115 and the static tokens P 103 through a skip connection i.e. $P+P^q$. In this way, the PLM 130 generates, for each task T:

$$P_r(Y|T, P, P^q, X) \stackrel{def}{=} PLM_\theta([T, P+P^q, X]).$$

Figure 2:
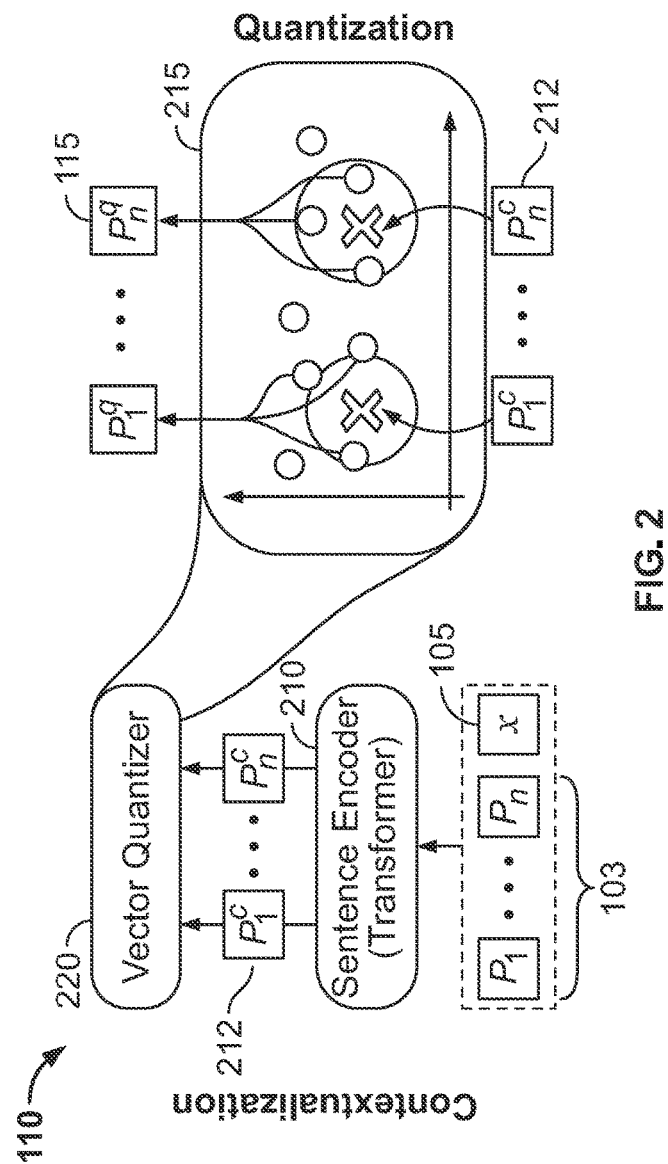
FIG. 2 is a simplified diagram illustrating an exemplary architecture of the contextualization and quantization module 110 shown in FIG. 1, according to embodiments described herein.

FIG. 2 is a simplified diagram illustrating an exemplary architecture of the contextualization and quantization module 110 shown in FIG. 1, according to embodiments described herein. The CQ module 110 comprises a transformer sentence encoder 210 and a vector quantizer 220. The CQ module 110 expects the input as a concatenation of input-agnostic soft tokens P 103 and the input X 105, by prepending input X with the input-agnostic soft tokens P, to be fed to the sentence encoder 210.

In one embodiment, the pair [P, X] is passed through the trainable transformer-based sentence encoder 210, which generates an input-contextualized set of prompt tokens $P^c$ 212. To reduce the number of trainable parameters and perform meaningful contextualization that is coherent with the input space of PLM, non-tunable input embedding of PLM is used for mapping tokens in X to respective vectors. For a given task T, P acts as a set of constant vectors. Through the attention mechanism in the transformer sentence encoder, P is fused with the context information from X.

In one embodiment, to keep the number of trainable parameters of the sentence encoder low, contextualization may be performed in a lower dimensional space. $P \in \mathbb{R}^{n \times d}$ from d to d' dimensions (d'<d) to obtain $P_l \in \mathbb{R}^{n \times d'}$. $P_l$ is subsequently fed into a two-layer transformer encoder layers in the sentence encoder, which has four attention heads and dense layers of dimension {d'×2d', 2d'×d'}. The output of this transformer encoder 210 is projected back from d' to d-dimension space to get the contextualized prompt token representation $P^c$. The input and output projections are also dense layers with trainable parameters. For example, the dimension of the transformer sentence encoder may be set as d=768 and d'=32.

In one embodiment, the continuous token embeddings $P^c$ 212 at the output of the sentence encoder 210 may be directly used as the final soft token prompts to be concatenated with the input X and then fed to the PLM 130.

In another embodiment, embeddings $P^c$ 212 may suffer from high variance in their representations across diverse inputs for a given task, owing to their direct dependence on input tokens X. This high variance behaves as noise for the frozen PLM 130, resulting in unstable performance and poor generalization. Another potential limitation of directly utilizing the contextual tokens as prompts is representation collapse resulting in $P^c$ becoming a constant embedding ignoring the input context. The posterior collapse issue persists unless specifically treated, particularly due to the downstream PLM being frozen. Thus, instead of using token embeddings $P^c$ 212 as soft token prompts, a vector quantizer 220 then receives the prompt tokens $P^c$ 212, which independently perform quantization for each prompt token to obtain quantized prompt tokens $P^q$ 115.

In one implementation, the vector quantizer 220 maintains a set of K learnable codebook vectors $e \in \mathbb{R}^{K \times d}$ shared across all the contextualized soft tokens in $P^c$. The quantization is independently performed on each $p_i^c \in P^c$, by sampling a mixture of codebook entries from e that are closest in representation to $p_i^c$ 212 in order to obtain the corresponding quantized prompts $p_i^q$ 115. To implement this quantization process, logits $l_i^k$ is defined for the i-th token pf as negative of its squared euclidean distance from the k-th codebook vector. The quantizer 220 then samples, with replacement, m latent codes for each prompt token $p_i^c$, from a Multinomial distribution over the logits $l_i$. A Soft-EM training component can then be computed as:

$$l_i^k = -\frac{1}{\tau}\|p_i^c - e_k\|_2^2$$

$$z_i^1, \ldots, z_i^m \sim \text{Multinomial}\left(l_i^1, \ldots, l_i^K\right)$$

The quantized $p_i^c$, i.e., $p_i^q$ can be obtained by averaging over the samples obtained from the multinomial sampling:

$$p_i^q = \frac{1}{m}\sum_{j=1}^{m} e_{z_i^j}$$

For experimental stability during the initial phase of training, the logits are divided with a normalization constant to encourage sampling at Multinomial sampling to choose from a broad range of codebook vectors in the beginning.

Figure 3:
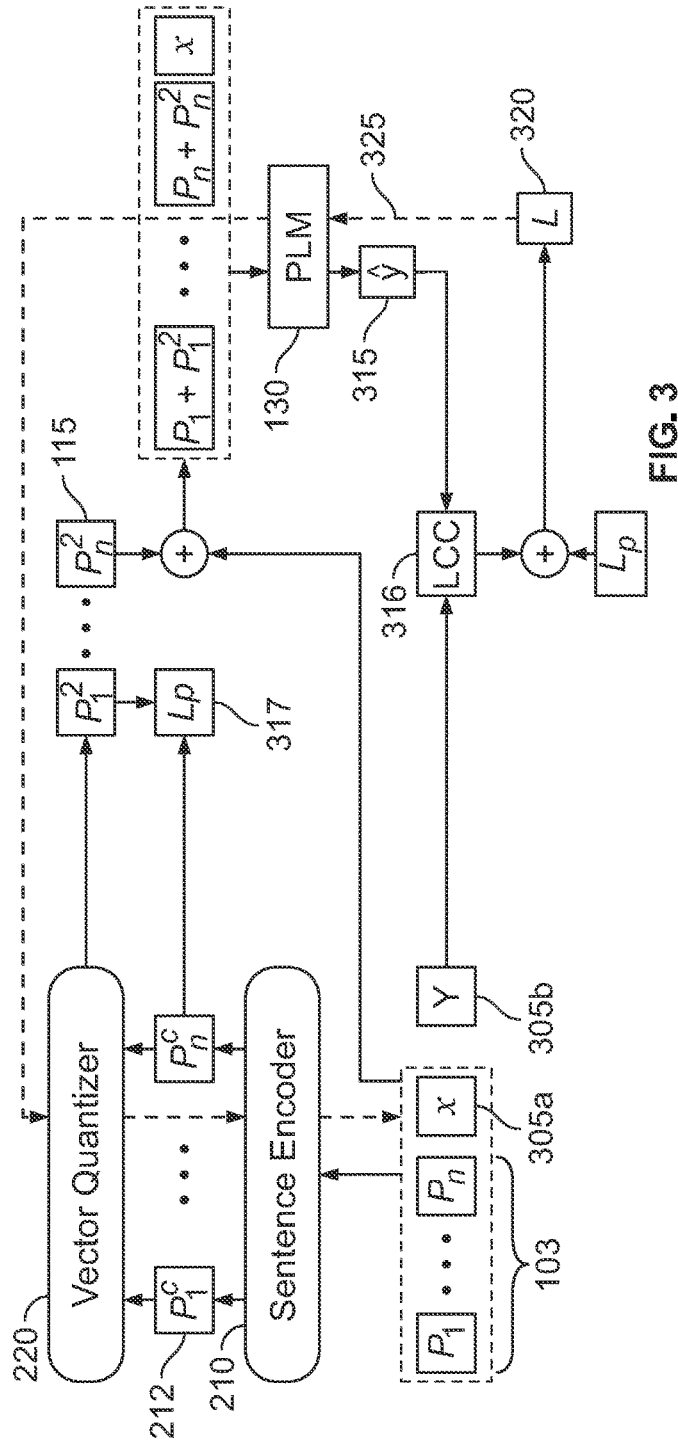
FIG. 3 is a simplified diagram illustrating a training framework for the VIP running system described in FIGS. 1-2, according to embodiments described herein.

FIG. 3 is a simplified diagram illustrating a training framework for the VIP running system described in FIGS. 1-2, according to embodiments described herein. At training stage, the objective is to minimize cross-entropy loss between the output 315 generated by PLM 130 and the ground truth sequence of tokens 305b. For example, a training pair of (x, y), e.g., the input text x 305a and ground-truth label y 305b of the input text, may be received, while the input text x 305a is prepended with soft tokens 103 and fed to the sentence encoder 210 in a similar manner as described in FIGS. 1-2, which eventually leads to the PLM 130 to generate an output label 315.

A cross-entropy loss 316 may be computed by comparing the output label 315 and the ground truth label 305b. Another loss component $L_p$ 317 may be computed by comparing the contextualized prompt 212 and the quantized prompt 115. Specifically, the training loss objective 320 by adding the two loss components 316 and 317:

$$L = L_{CE} + \beta \sum_{i=1}^{n} \|p_i^c - sg(p_i^q)\|_2^2$$

where $L_{CE}$ denotes the cross-entropy loss 316 computed by comparing the predicted label from PLM 130 and the ground truth label y; sg( ) refers to the stop gradient operator such that sg(x)=x in the forward pass and zero on the backward pass. $\beta$ is the weight for commitment cost, i.e., how important it is to the encoder output to stay close to the sampled codebook vectors. The gradient of the loss is passed back through the PLM (while parameters of PLM 130 is frozen) via the backpropagation path 325 (represented by dashed arrows) to train the encoder 210 and P 103. In this way, the sentence encoder 210, soft tokens P 103, and codebook vector used by the vector quantizer 220 comprise the set of trainable parameters are updated while the parameter set of PLM 130 are frozen.

In one embodiment, to update the codebook adopted by the vector quantizer 220, the exponential moving average (EMA) update of the codebook vectors are computed. Specifically, for each batch, the first step is to count the number of times j-th codebook vector is sampled and the count vector $c_j$ is updated:

$$c_j = \lambda c_j + (1-\lambda) \sum_{i \in [n], p \in [m]} \mathbb{1}[z_i^p = e_j]$$

Next step is to update the codebook embedding of j-th codebook vector $e_j$ by taking the mean of sentence encoder outputs for which the codebook vector was sampled during Multinomial sampling:

$$e_j = \lambda e_j + (1-\lambda) \sum_{i \in [n], p \in [m]} \cdot$$

where $\lambda$ is decay parameter set to 0.99, 1 is the indicator function, [n] denotes $\{1, \ldots, n\}$.

Figure 4:
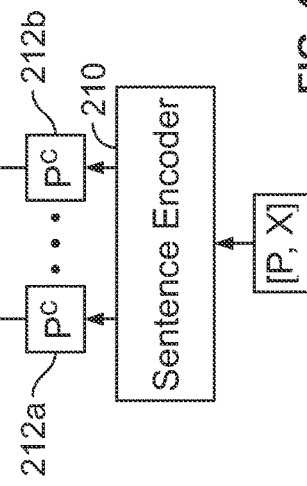
FIG. 4 is a simplified block diagram illustrating noise resilience training for the sentence encoder described in FIGS. 1-3, according to embodiments described herein.

FIG. 4 is a simplified block diagram illustrating noise resilience training for the sentence encoder 210 described in FIGS. 1-3, according to embodiments described herein. In one embodiment, to update the sentence encoder 210, noise resilience training may be adopted. The same input [P, X] may be passed to the sentence encoder 210 twice to obtain two sets of representations 212a and 212b of the same batch. For a batch with B samples, noise is computed as the similarity 410 between two sentence encoder representations 212a and 212b as:

$$sim_{(i,j)} = -\|p_i^c - p_j^c\|_2$$

Let i and i+ represent the representation of the i-th sample from the batch fed to the encoder twice, sample-wise noise resilience loss is computed as:

$$l_i = -\log\left(\frac{e^{sim(i,i^+)}}{\sum_{(i \in [B], j \in [B])} e^{sim(i,j)} + e^{sim(i,j^+)}}\right)$$

the batch noise resilience loss 412 can be computed as:

$$L_{NC} = \frac{1}{B}\sum_{i \in [B]} l_i.$$

The noise resilience loss 412 may be added to the loss term L 320 to update the sentence encoder 210, P 103 and the codebook in vector quantizer 220.

Computer Environment

Figure 5:
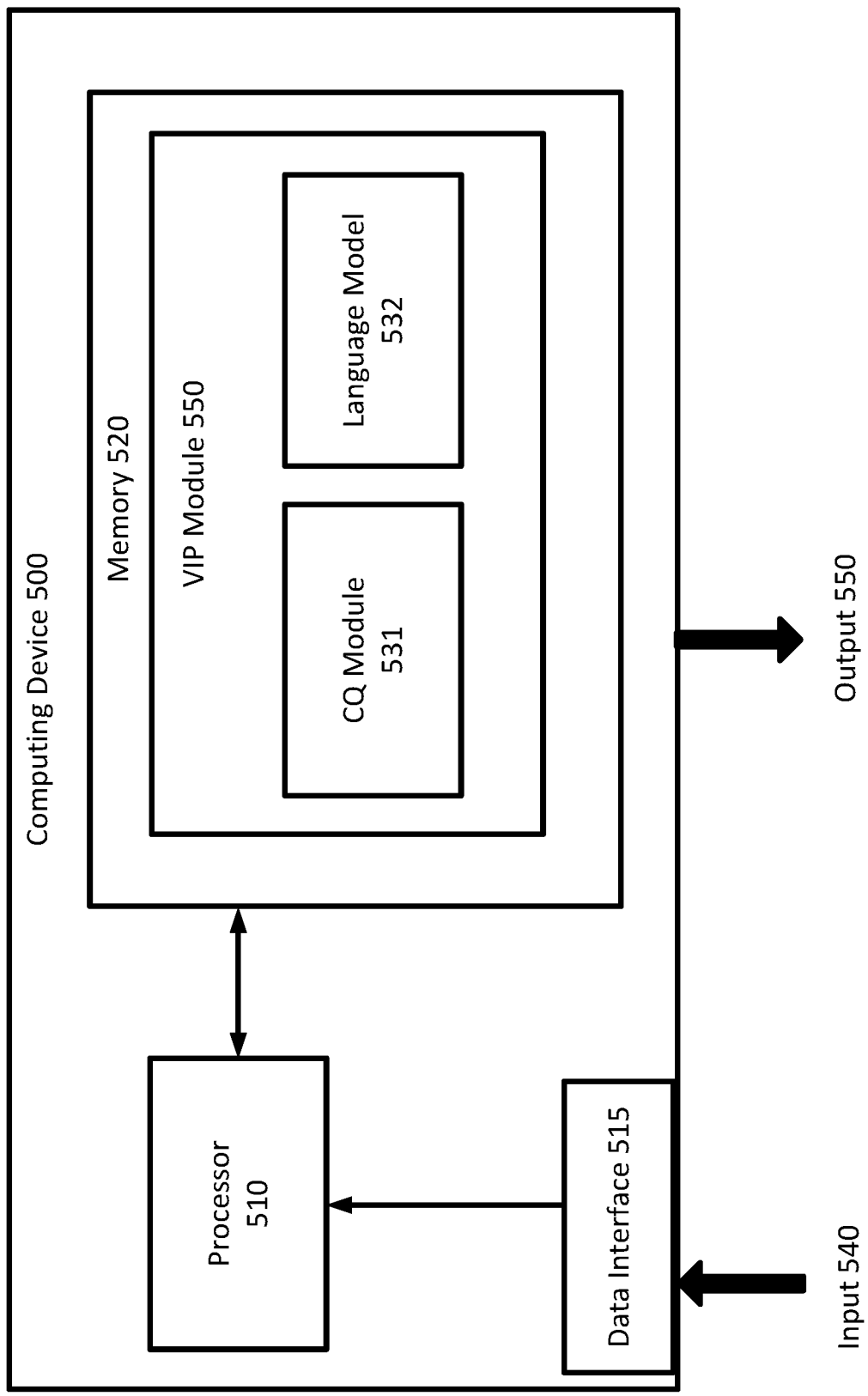
FIG. 5 is a simplified diagram of a computing device 500 for implementing the VIP framework shown in FIG. 1, according to some embodiments.

FIG. 5 is a simplified diagram of a computing device 500 for implementing the VIP framework shown in FIG. 1, according to some embodiments. As shown in FIG. 5, computing device 500 includes a processor 510 coupled to memory 520. Operation of computing device 500 is controlled by processor 510. And although computing device 500 is shown with only one processor 510, it is understood that processor 510 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 500. Computing device 500 may be implemented as a stand-alone subsystem, as a board added to a computing device, and/or as a virtual machine.

Memory 520 may be used to store software executed by computing device 500 and/or one or more data structures used during operation of computing device 500. Memory 520 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 510 and/or memory 520 may be arranged in any suitable physical arrangement. In some embodiments, processor 510 and/or memory 520 may be implemented on a same board, in a same package (e.g., system-in-package), on a same chip (e.g., system-on-chip), and/or the like. In some embodiments, processor 510 and/or memory 520 may include distributed, virtualized, and/or containerized computing resources. Consistent with such embodiments, processor 510 and/or memory 520 may be located in one or more data centers and/or cloud computing facilities.

In some examples, memory 520 may include non-transitory, tangible, machine readable media that includes executable code that when run by one or more processors (e.g., processor 510) may cause the one or more processors to perform the methods described in further detail herein. For example, as shown, memory 520 includes instructions for the VIP module 530 that may be used to implement and/or emulate the systems and models, and/or to implement any of the methods described further herein. A VIP module 530 may receive input 540 that includes a natural language input for a specific downstream task such as a question, a document for summarization, and/or the like via the data interface 515. The VIP module 530 may generate an output 550 such as an output for the downstream task.

In some embodiments, the VIP module 530 includes the CQ module 531 (e.g., similar to 110 in FIG. 1), and the language model 532 (e.g., similar to 130 in FIG. 1). The CQ module 531 may further includes a sentence encoder submodule (e.g., similar to 210 in FIG. 2) and a vector quantization submodule (e.g., similar to 220 in FIG. 2). The CQ module may receive an input 540 of an input text, and then generate a final soft token prompt based on the input text to feed into the language module 532. The language model 532 may prepend the final soft token prompts from the CQ module 531 with the input text and generate an output label.

In one embodiment, the VIP module 530 and its submodules 531-332 may be implemented by hardware, software and/or a combination thereof.

Some examples of computing devices, such as computing device 500 may include non-transitory, tangible, machine-readable media that include executable code that when run by one or more processors (e.g., processor 510) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 6:
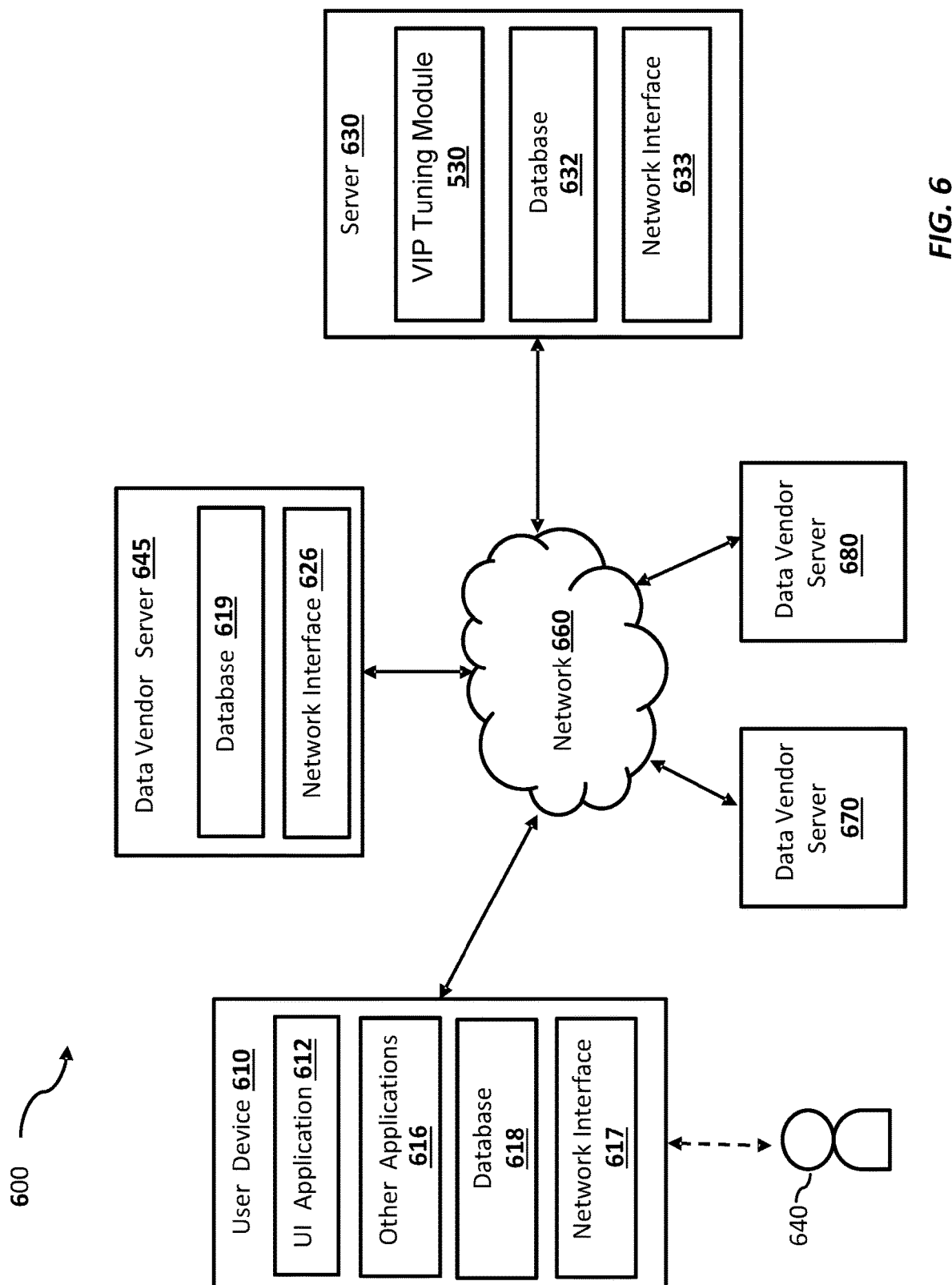
FIG. 6 is a simplified block diagram of a networked system suitable for implementing the VIP tuning framework described in FIGS. 1-2 and other embodiments described herein.

FIG. 6 is a simplified block diagram of a networked system suitable for implementing the VIP tuning framework described in FIGS. 1-2 and other embodiments described herein. In one embodiment, block diagram 600 shows a system including the user device 610 which may be operated by user 640, data vendor servers 645, 670 and 680, server 630, and other forms of devices, servers, and/or software components that operate to perform various methodologies in accordance with the described embodiments. Exemplary devices and servers may include device, stand-alone, and enterprise-class servers which may be similar to the computing device 100 described in FIG. 1, operating an OS such as a MICROSOFT® OS, a UNIX® OS, a LINUX® OS, or other suitable device and/or server-based OS. It can be appreciated that the devices and/or servers illustrated in FIG. 6 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 610, data vendor servers 645, 670 and 680, and the server 630 may communicate with each other over a network 660. User device 610 may be utilized by a user 640 (e.g., a driver, a system admin, etc.) to access the various features available for user device 610, which may include processes and/or applications associated with the server 630 to receive an output data anomaly report.

User device 610, data vendor server 645, and the server 630 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 600, and/or accessible over network 660.

User device 610 may be implemented as a communication device that may utilize appropriate hardware and software configured for wired and/or wireless communication with data vendor server 645 and/or the server 630. For example, in one embodiment, user device 610 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 610 of FIG. 6 contains a user interface (UI) application 612, and/or other applications 616, which may correspond to executable processes, procedures, and/or applications with associated hardware. For example, the user device 610 may receive a message indicating an output label of an input text from the server 630 and display the message via the UI application 612. In other embodiments, user device 610 may include additional or different modules having specialized hardware and/or software as required.

In various embodiments, user device 610 includes other applications 616 as may be desired in particular embodiments to provide features to user device 610. For example, other applications 616 may include security applications for implementing client-side security features, programmatic client applications for interfacing with appropriate application programming interfaces (APIs) over network 660, or other types of applications. Other applications 616 may also include communication applications, such as email, texting, voice, social networking, and IM applications that allow a user to send and receive emails, calls, texts, and other notifications through network 660. For example, the other application 616 may be an email or instant messaging application that receives a prediction result message from the server 630. Other applications 616 may include device interfaces and other display modules that may receive input and/or output information. For example, other applications 616 may contain software programs for asset management, executable by a processor, including a graphical user interface (GUI) configured to provide an interface to the user 640 to view the output label (e.g., 135 in FIG. 1).

User device 610 may further include database 618 stored in a transitory and/or non-transitory memory of user device 610, which may store various applications and data and be utilized during execution of various modules of user device 610. Database 618 may store user profile relating to the user 640, predictions previously viewed or saved by the user 640, historical data received from the server 630, and/or the like. In some embodiments, database 618 may be local to user device 610. However, in other embodiments, database 618 may be external to user device 610 and accessible by user device 610, including cloud storage systems and/or databases that are accessible over network 660.

User device 610 includes at least one network interface component 619 adapted to communicate with data vendor server 645 and/or the server 630. In various embodiments, network interface component 619 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 645 may correspond to a server that hosts one or more of the databases 603a-n (or collectively referred to as 603) to provide training datasets including text-label training pairs to the server 630. The database 603 may be implemented by one or more relational database, distributed databases, cloud databases, and/or the like.

The data vendor server 645 includes at least one network interface component 626 adapted to communicate with user device 610 and/or the server 630. In various embodiments, network interface component 626 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 645 may send asset information from the database 603, via the network interface 626, to the server 630.

The server 630 may be housed with the VIP tuning module 530 and its submodules described in FIG. 5. In some implementations, module 130 may receive data from database 619 at the data vendor server 645 via the network 660 to generate an output label. The generated output label may also be sent to the user device 610 for review by the user 640 via the network 660.

The database 632 may be stored in a transitory and/or non-transitory memory of the server 630. In one implementation, the database 632 may store data obtained from the data vendor server 645. In one implementation, the database 632 may store parameters of the VIP tuning model 530. In one implementation, the database 632 may store previously generated prompts, and the corresponding input feature vectors.

In some embodiments, database 632 may be local to the server 630. However, in other embodiments, database 632 may be external to the server 630 and accessible by the server 630, including cloud storage systems and/or databases that are accessible over network 660.

The server 630 includes at least one network interface component 633 adapted to communicate with user device 610 and/or data vendor servers 645, 670 or 680 over network 660. In various embodiments, network interface component 633 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 660 may be implemented as a single network or a combination of multiple networks. For example, in various embodiments, network 660 may include the Internet or one or more intranets, landline networks, wireless networks, and/or other appropriate types of networks. Thus, network 660 may correspond to small scale communication networks, such as a private or local area network, or a larger scale network, such as a wide area network or the Internet, accessible by the various components of system 600.

Example Workflows

Figure 7:
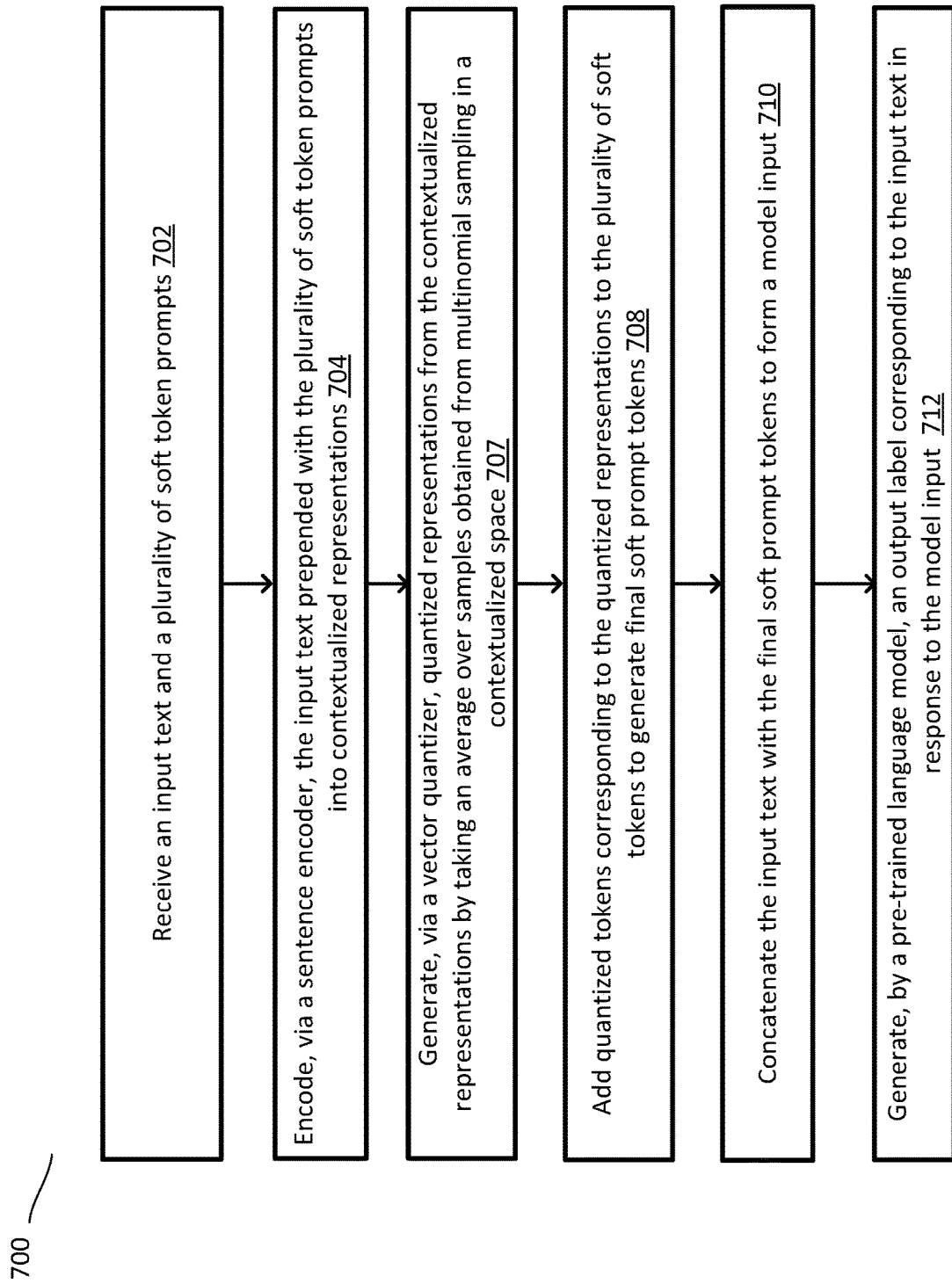
FIG. 7 is an example logic flow diagram illustrating a method of generating vector-quantized input-contextualized soft prompts for natural language understanding based on the framework shown in FIGS. 1-2, according to some embodiments described herein.

FIG. 7 is an example logic flow diagram illustrating a method 700 of generating vector-quantized input-contextualized soft prompts for natural language understanding based on the framework shown in FIGS. 1-2, according to some embodiments described herein. One or more of the processes of method 800 may be implemented, at least in part, in the form of executable code stored on non-transitory, tangible, machine-readable media that when run by one or more processors may cause the one or more processors to perform one or more of the processes. In some embodiments, method 700 corresponds to the operation of the VIP tuning module 530 (e.g., FIGS. 5-6).

At step 702, an input text (e.g., 105 in FIGS. 1-2) and a plurality of soft token prompts (e.g., 103 in FIGS. 1-2) may be received, e.g., via a data interface 515 in FIG. 5.

At step 704, a sentence encoder (e.g., 210 in FIG. 2) may encode the input text prepended with the plurality of soft token prompts into contextualized representations (e.g., 212 in FIG. 2) in the contextualized space. For example, an attention mechanism in the sentence encoder may fuse the plurality of soft token prompts with context information from the input text. For another example, an original dimension of the plurality of soft token prompts may be converted to a lower dimensional space. The projected plurality of soft token prompts are then encoded in the lower dimensional space through two transformer encoder layers of the lower dimension and the encoding from the lower dimensional space is converted back to the original dimension.

At step 707, a vector quantizer (e.g., 220 in FIG. 2) may generate quantized representations (e.g., 115 in FIGS. 1-2) from the contextualized representations by taking an average over samples obtained from multinomial sampling in a contextualized space (e.g., 215 in FIG. 2). Further details of step 707 are further discussed in FIG. 8.

At step 708, quantized tokens corresponding to the quantized representations are added to the plurality of soft tokens to generate final soft prompt tokens (e.g., 117 in FIG. 1).

At step 710, the input text (e.g., 105 in FIG. 1) are concatenated with the final soft prompt tokens (e.g., 117 in FIG. 1) to form a model input.

At step 712, a pre-trained language model (e.g., 130 in FIG. 1) may generate an output label (e.g., 135 in FIG. 1) corresponding to the input text in response to the model input.

Figure 8:
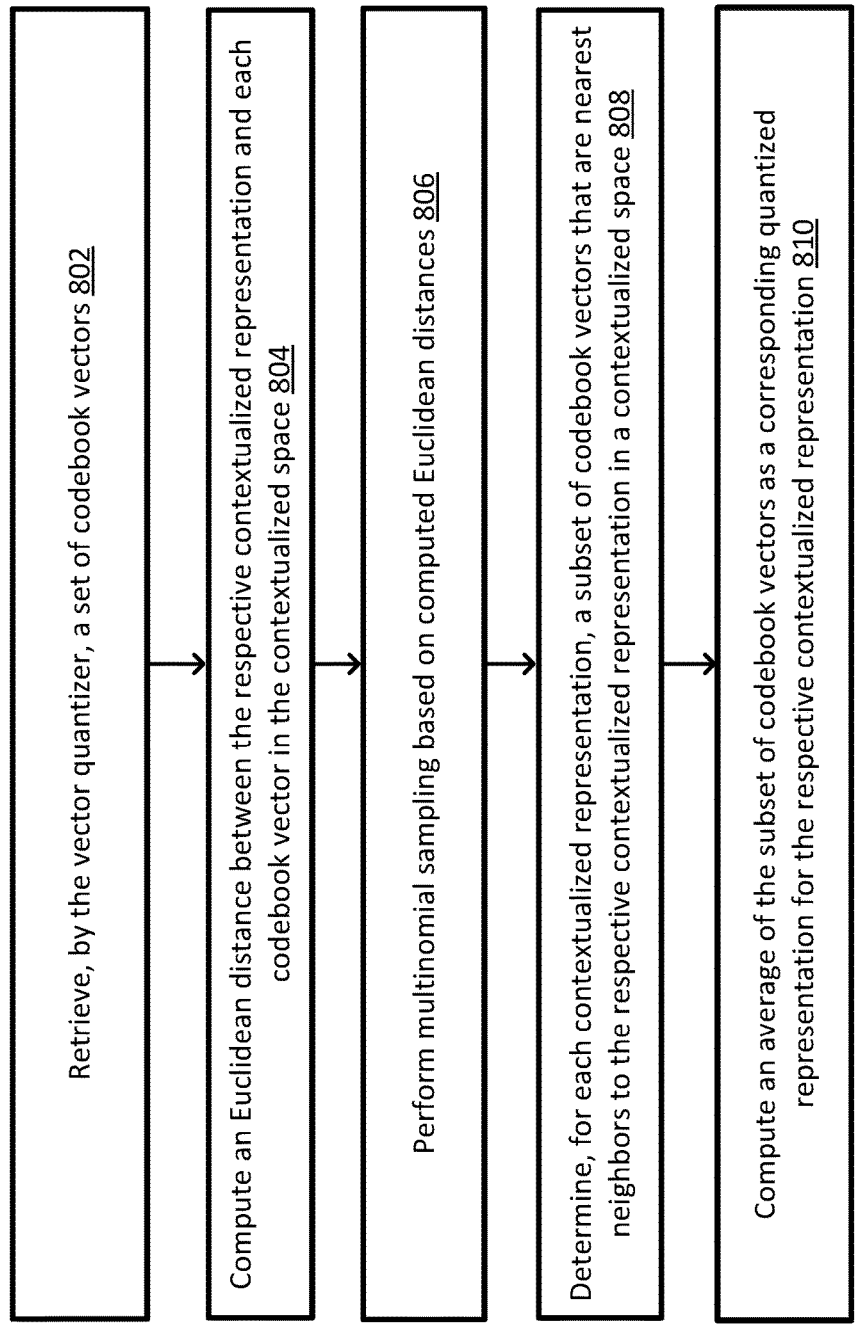
FIG. 8 is an example logic flow diagram illustrating the process of quantizing the contextualized soft prompts as shown in FIG. 7, according to some embodiments described herein.

FIG. 8 is an example logic flow diagram illustrating the process 707 of quantizing the contextualized soft prompts as shown in FIG. 7, according to some embodiments described herein. One or more of the processes of method 707 may be implemented, at least in part, in the form of executable code stored on non-transitory, tangible, machine-readable media that when run by one or more processors may cause the one or more processors to perform one or more of the processes. In some embodiments, method 700 corresponds to the operation of the VIP tuning module 530 (e.g., FIGS. 5-6).

At step 802, the vector quantizer (e.g., 220 in FIG. 2) may retrieve a set of codebook vectors.

At step 804, the vector quantizer may compute a Euclidean distance between the respective contextualized representation and each codebook vector in the contextualized space (e.g., 215 in FIG. 2). For example, the set of codebook vectors are trainable.

At step 806, the vector quantizer may perform multinomial sampling based on the computed Euclidean distances.

At step 808, the vector quantizer may determine, for each contextualized representation, a subset of codebook vectors that are nearest neighbors to the respective contextualized representation in the contextualized space. For example, the nearest neighbors are obtained from multinomial sampling based on computed Euclidean distances. For another example, when there are multiple occurrences of the respective item, the subset of codebook vectors may comprise multiple subsets, each including neighbors that are nearest neighbors to one contextualized representation corresponding to one occurrence of the item.

At step 810, the vector quantizer may compute an average of the subset of codebook vectors as a corresponding quantized representation for the respective contextualized representation.

Figure 9:
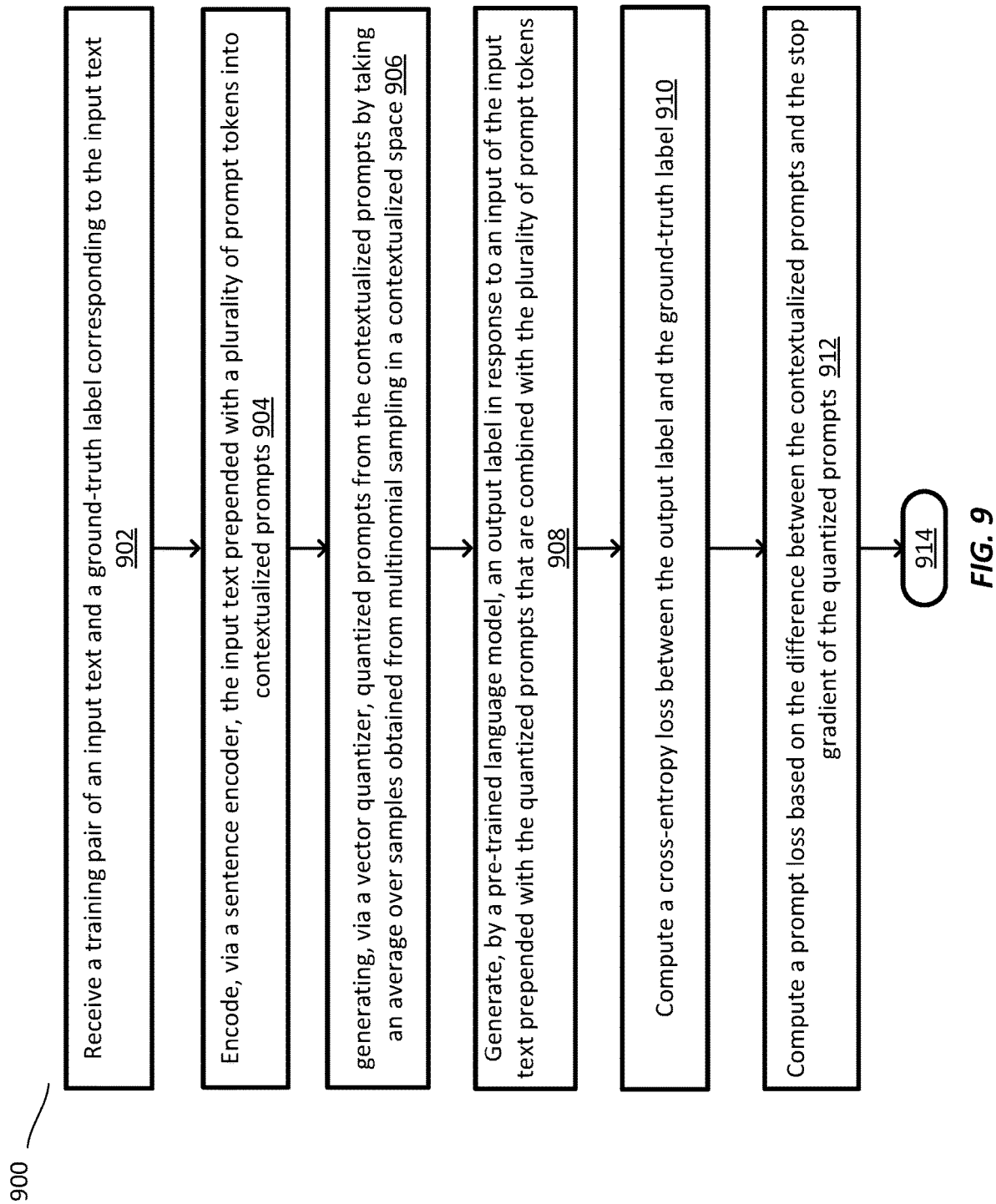
FIG. 9 is an example logic flow diagram illustrating the process of training the VIP tuning system shown in FIGS. 1-2, according to some embodiments described herein.

FIG. 9 is an example logic flow diagram illustrating the process 900 of training the VIP tuning system shown in FIGS. 1-2, according to some embodiments described herein. One or more of the processes of method 900 may be implemented, at least in part, in the form of executable code stored on non-transitory, tangible, machine-readable media that when run by one or more processors may cause the one or more processors to perform one or more of the processes. In some embodiments, method 700 corresponds to the operation of the VIP tuning module 530 (e.g., FIGS. 5-6).

At step 902, a training pair of an input text (e.g., 305a in FIG. 3) and a ground-truth label (e.g., 305b in FIG. 3) corresponding to the input text may be received, e.g., via a communication interface 515 in FIG. 5.

At step 904, a sentence encoder (e.g., 210 in FIG. 3) may encode the input text prepended with a plurality of prompt tokens (e.g., 103 in FIG. 3) into contextualized prompts, in a similar manner as described at step 704 of method 700 in FIG. 7.

At step 906, a vector quantizer may generate quantized prompts (e.g., 115 in FIG. 3) from the contextualized prompts, in a similar manner as described at step 707 of method 700 in FIG. 7 and more details in FIG. 8.

At step 908, a pre-trained language model (e.g., 130 in FIG. 3) may generate an output label in response to an input of the input text prepended with the quantized prompts that are combined with the plurality of prompt tokens, e.g., in a similar manner as described at steps 708-712 of method 700 in FIG. 7.

At step 910, a cross-entropy loss (e.g., 316 in FIG. 3) may first be computed between the output label (e.g., 315 in FIG. 3) and the ground-truth label (e.g., 305b in FIG. 3). For example, the pre-trained language model (e.g., 130 in FIG. 3) may optionally be updated based on the cross-entropy loss. In some implementations, the pre-trained language model does not need to be updated based on the cross-entropy loss.

At step 912, a prompt loss component (e.g., 317 in FIG. 3) is computed by the difference between the contextualized prompts and the stop gradient of the quantized prompts. For example, the stop gradient is computed as a difference between the contextualized prompts and the quantized prompts in a forward pass and as zero in a backward pass.

At steps 914-918, a noise resilience loss may be optionally computed. For example, at step 914, the input text may be sent to the sentence encoder to obtain a first contextualized representation (e.g., 212a in FIG. 4) and a second contextualized representation (e.g., 212b in FIG. 4). At step 916, a similarity metric (e.g., 410 in FIG. 4) may then be computed between the first contextualized representation and the second contextualized representation. At step 918, the noise resilience loss (e.g., 412 in FIG. 4) is then computed based on similarity metrics of training samples in a training batch.

At step 920, a training objective may be computed by adding the cross-entropy loss, the prompt loss and optionally the noise resilience loss.

At step 922, the sentence encoder (e.g., 210 in FIG. 3) and the vector quantizer (e.g., 220 in FIG. 3) including the codebook vectors, the prompt tokens (e.g., 103 in FIGS. 1-3) may be updated based on the computed training objective (e.g., 320 in FIG. 3) via a backpropagation path (e.g., 325 in FIG. 3) while freezing parameters of the pre-trained language model (e.g., 130 in FIG. 3). In some implementations, the parameters of the pre-trained language model may be frozen after being updated by the cross-entropy loss.

Example Data Experiments and Performance

Example data experiments are based on a wide range of language understanding tasks including natural language inference, extractive, and multiple-choice question answering, relation classification, and named entity recognition. For example, the tasks include: SuperGLUE (Wang et al., Superglue: A stickier benchmark for general-purpose language understanding systems, Advances in neural information processing systems, 32, 2019): to gauge the general language understanding capabilities of VIP against baselines, data experiments are evaluated on SuperGLUE benchmark. It comprises of eight tasks-BoolQ (Clark et al., Boolq: Exploring the surprising difficulty of natural yes/no questions, arXiv preprint arXiv:1905.10044, 2019), CB (De Marneffe et al., the CommitmentBank: Investigating projection in naturally occurring discourse, in proceedings of Sinn und Bedeutung, volume 23, pages 107-124, 2019), COPA (Roemmele et al., Choice of plausible alternatives: An evaluation of commonsense causal reasoning, in proceedings of AAAI spring symposium: logical formalizations of commonsense reasoning, pages 90-95, 2011), MultiRC (Khashabi et al., Looking beyond the surface: A challenge set for reading com prehension over multiple sentences, in Proceedings of the 2018 Conference of the North American Chapter of the Association for Computational Linguistics: Human Language Technologies, Volume 1 (Long Papers), pages 252-262, 2018), ReCoRD (Zhang et al., Record: Bridging the gap between human and machine commonsense reading comprehension, arXiv preprint arXiv: 1810.12885, 2018), RTE (Haim et al., The second pascal recognising textual entailment challenge, in Proceedings of the Second PASCAL Challenges Workshop on Recognising Textual Entailment, volume 7, 2006), WiC (Pilehvar et al., Wic: 10,000 example pairs for evaluating context-sensitive representations, in proceedings of CoRR, abs/1808.09121, 2018), and WSC (Levesque et al., The winograd schema challenge, in proceedings of thirteenth international conference on the principles of knowledge representation and reasoning, 2012).

QA (Fisch et al., Mrqa 2019 shared task: Evaluating generalization in reading comprehension. arXiv preprint arXiv:1910.09753, 2019) is an extractive QA task. The MRQA 2019 shared task consists of multiple question-answering datasets. Six datasets are dedicated each for training and testing while a small portion of training datasets is held-out for model selection. It focuses on evaluating the generalization of a QA system, i.e., how well it performs on out-of-domain examples. [Multiple choice QA]: RACE-middle (Lai et al., RACE: Large-scale reading comprehension dataset from examinations, in proceedings of Conference on Empirical Methods in Natural Language Processing (EMNLP), 2017) provides four candidate answers for each question. The system is asked to predict the one correct answer. Other datasets in this category, MultiRC, and ReCoRD, are incorporated earlier in SuperGLUE.

Relation classification is a task to identify the semantic relation between two specified entities in a sentence. For this task, two datasets—SemEval 2010 task 8 (Hendrickx et al., SemEval-2010 task 8: Multi-way classification of semantic relations between pairs of nominals, in Proceedings of the 5th International Workshop on Semantic Evaluation, pages 33-38, 2010) and TACRED (Zhang et al., Position-aware attention and supervised data improve slot filling. In Proceedings of the 2017 Conference on Empirical Methods in Natural Language Processing (EMNLP), pages 35-45, 2017) are used. SemEval is a 19-way classification problem. While TACRED is a relatively large-scale dataset that aims to classify relation in 41 relation types.

NER is the names entity recognition task. The English language dataset of CoNLL-2003 shared task (Sang et al., Introduction to the CoNLL-2003 shared task: Language-independent named entity recognition, in Proceedings of the Seventh Conference on Natural Language Learning at HLT-NAACL, pages 142-147, 2003) is used.

Additionally, for NLI tasks, Adversarial NLI (ANLI) that is a large-scale benchmark dataset to gauge natural language inference capabilities of the system (Nie et al., Adversarial NLI: A new benchmark for natural language understanding. arXiv preprint arXiv:1910.14599, 2019) is used.

The VIP tuning system is compared with a number of baselines. For single-task in domain performance, VIP is compared against the traditional PT system shown in FIG. 1(B) (also see Lester et al., The power of scale for parameter-efficient prompt tuning. arXiv preprint arXiv: 2104.08691, 2021), VIP-IDP (Instance-Dependent Prompt Generation Method (IDPG) described in Wu et al., IDPG: An instance-dependent prompt generation method, arXiv preprint arXiv:2204.04497, 2022), Adapter, FT (the standard task-specific fine-tuning of PLM described in Raffel et al., Exploring the limits of transfer learning with a unified text-to-text transformer, arXiv preprint arXiv:1910.10683, 2019). Specifically, to evaluate cross-domain generalization in MRQA, VIP is compared against the primary baseline PT. VIP-C refers to VIP with no quantization. Hence the output of sentence encoder $P^c$ is directly used in for prompting.

For a direct comparison with PT, the data experiments are conducted on the LM-adapted version of T5-base encoder-decoder PLM. The study in Lester et al. on finding the best prompt length is adopted with fixed number of prompt tokens to n=100 for PT, VIP and VIP-IDP. For the classification tasks such as relation classification and NLI, the set of label tokens to [$P^q$, X] are prepended along with the task description. The label tokens are kept as non-trainable. For VIP-IDP setting, the weight is kept as learnable parameters in the feedforward generator network. This is to enforce the model to rely its predictions on soft tokens which are generated from the input X6. FT feeds X to the PLM and fine-tunes the model parameters. Following the same setting as FT, Adapter learns adapter layer weights as proposed while keeping the PLM parameters frozen. For all the experiments, the model is trained to optimize standard cross-entropy loss. To find the learning rate for QC, VIP-IDP, and Adapter, grid search over {0.0001, 0.0005, 0.001} is performed. The learning rate is set as 0.3 for soft prompt parameters P and batch size 32). The quantizer comprises 1000 codebook vectors as parameters learned through EMA. We find commitment cost $\beta=0.1$ is set after performing grid search over {0.01, 0.1, 1}. Data experiments are run for 30K steps. Different evaluation step sizes for different datasets including epoch-wise evaluation are used, e.g., at 500 steps, and at 2K steps. Early stopping is tuned according to the evaluation step size and the number of train data samples.

In FIG. 10, the development set scores on SuperGLUE is reported. The reported numbers indicate average across three random seeds. FT and Adp models with a large number of trainable parameters show significantly better performance than prompt-based methods on the three largest datasets, i.e., ReCORD, BoolQ, and MultiRC. However, these models perform slightly worse than prompt-based methods on COPA which is a small-scale dataset with only 400 number of training samples. COPA is a difficult task that requires commonsense causal reasoning, hence tuning large number of parameters will warrant a large number of training sample. While a large parameter set can be tuned with less number of samples to solve simpler tasks such as textual entailment in CB. VIP-IDP shows the worst performance in most of the SuperGLUE tasks. It is also noticed that it shows poor variance across seeds. This is due to the strict dependence of the prompt tokens on input X. VIP comprises of P which acts as input independent tokens in the prompt.

VIP outperforms the prompt-based baselines on seven out of eight SuperGLUE tasks. There is a drop in performance when the quantization bottleneck is removed (VIP-C). This is due to the noise due to high variance at the sentence encoder's output. The performance difference between VIP and VIP-C is higher for the tasks with small number of data samples such as CB, COPA, and WSC. Small datasets can cause underfitting that leads to high output variance.

In FIG. 11, VIP outperforms all the prompt-based baselines on relation classification tasks. Even without quantization (VIP-C), the context helps relation classification tasks to perform better than the soft prompt PT. Next, the systems are tasked to perform extractive question answering. In MRQA shared task, since the test domain is different from the train and development domain, in-domain testing of models is carried out on the development data. For model selection, 10% from the training set is held out.

FIG. 12 compares performance on QA datasets from MRQA task and RACE-M. Observing VIP against VIP-C, the former takes advantage of the quantization bottleneck to perform better at extracting correct answers from the passage. VIP also performs better in choosing the correct answer from a list of candidate answers. In all experiments, full model tuning FT and adapter-based training Adp outperform prompt-based systems. This is due to a large number of learnable parameters.

FIG. 13 shows out-of-domain F1 performance comparison of VIP against PT on MRQA task. The numbers in and out of the parentheses indicate score obtained by VIP and PT, respectively. VIP and PT models on out of domain (OOD) MRQA test set. It is observed that VIP TriviaQA, NaturalQuestions QA and HotpotQA outperform PT in more than half of the OOD datasets while on the other datasets, it performs well on half of the tasks. Training on five train set out of six, VIP shows better F1 score than PT when averaged over all the test sets. FIG. 14 shows cross-domain performance of ANLI-based models. AXB and AXG are the test sets and RTE denotes combined train-development set from SuperGLUE. The data experiments are also evaluated on the test set of SNLI corpus (Bowman et al., A large annotated corpus for learning natural language inference, in Proceedings of the 2015 Conference on Empirical Methods in Natural Language Processing, pages 632-642, 2015). VIP shows significantly better results on all the OOD NLI tasks as compared to PT. Overall, it is observed VIP model gives, in general, better OOD results than PT. Multi-task experiments considering tasks from NLI (ANLI and RTE), extractive QA (MRQA train set), multiple choice QA (ReCoRD and RACE-M), NER (CoNLL), relation classification (SemEval and TACRED). For each task, 10K samples are chosen at random for both the training and validation set. The complete dataset is chosen where the training/validation set sizes are smaller than 10K. For evaluation, the complete test splits of all the datasets. For SuperGLUE-based tasks such as RTE and ReCoRD, the test on the validation set. Experiments are run for 50K steps, performing validation at every 2K step with an early stopping set to 5. The validation is done on each dataset separately and the model is chosen based on the best mean validation score.

As shown in FIG. 15, VIP performs better than PT in out of 9 out of 12 tasks. A lower score on TACRED and ConLL is due to the average validation performance-based model selection strategy. Thus, a larger gain in a few datasets, such as ANLI and RTE, can override the relatively small loss in other datasets.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of generating vector-quantized input-contextualized soft prompts for natural language understanding, the method comprising:
    receiving an input text and a plurality of soft token prompts;
    encoding, via a sentence encoder, the input text prepended with the plurality of soft token prompts into contextualized representations;
    generating, via a vector quantizer, quantized representations from the contextualized representations by taking an average over samples obtained from multinomial sampling in a contextualized space;
    adding quantized tokens corresponding to the quantized representations to the plurality of soft tokens to generate final soft prompt tokens;
    concatenating the input text with the final soft prompt tokens to form a model input; and
    generating, by a pre-trained language model, an output label corresponding to the input text in response to the model input, wherein the generating, via the vector quantizer, quantized representations comprises:
    retrieving, by the vector quantizer, a set of codebook vectors;
    determining, for each contextualized representation, a subset of codebook vectors that are nearest neighbors to the respective contextualized representation in a contextualized space; and
    computing an average of the subset of codebook vectors as a corresponding quantized representation for the respective contextualized representation.

2. The method of claim 1, wherein the encoding, via a sentence encoder, the input text prepended with the plurality of soft token prompts comprises:
    fusing, through an attention mechanism in the sentence encoder, the plurality of soft token prompts with context information from the input text.

3. The method of claim 1, wherein the encoding is performed by:
projecting an original dimension of the plurality of soft token prompts to a lower dimensional space;
encoding the projected plurality of soft token prompts in the lower dimensional space through two transformer encoder layers of the lower dimension; and
projecting the encoding from the lower dimensional space to the original dimension.

4. The method of claim 1, wherein the nearest neighbors are determined based on computing an Euclidean distance between the respective contextualized representation and each codebook vector in the contextualized space.

5. The method of claim 1, wherein the nearest neighbors are obtained from multinomial sampling based on computed Euclidean distances.

6. The method of claim 1, wherein the set of codebook vectors are trainable.

7. The method of claim 1, wherein the plurality of soft token prompts are trainable.

8. The method of claim 1, further comprising:
computing a cross-entropy loss between the output label and a ground-truth label; and
updating the pre-trained language model based on the cross-entropy loss.

9. The method of claim 8, further comprising:
computing a training objective comprising the cross-entropy loss and a prompt loss component, wherein the prompt loss component is computed by a difference between the contextualized representations and a stop gradient of the quantized representations, and
updating the sentence encoder and the vector quantizer based on the training objective while freezing parameters of the pre-trained language model.

10. A system of generating vector-quantized input-contextualized soft prompts for natural language understanding, the system comprising:
a data interface that receives an input text and a plurality of soft token prompts;
a memory storing a sentence encoder, a vector quantizer, a pre-trained language model and a plurality of processor-executed instructions; and
one or more processors that read and execute the processor-executed instructions from the memory to perform instructions comprising:
encoding, via a sentence encoder, the input text prepended with the plurality of soft token prompts into contextualized representations;
generating, via a vector quantizer, quantized representations from the contextualized representations by taking an average over samples obtained from multinomial sampling in a contextualized space;
adding quantized tokens corresponding to the quantized representations to the plurality of soft tokens to generate final soft prompt tokens;
concatenating the input text with the final soft prompt tokens to form a model input; and
generating, by a pre-trained language model, an output label corresponding to the input text in response to the model input, wherein an operation of the generating, via the vector quantizer, quantized representations comprises:
retrieving, by the vector quantizer, a set of codebook vectors;
determining, for each contextualized representation, a subset of codebook vectors that are nearest neighbors to the respective contextualized representation in a contextualized space; and
computing an average of the subset of codebook vectors as a corresponding quantized representation for the respective contextualized representation.

11. The system of claim 10, wherein an operation of the encoding, via a sentence encoder, the input text prepended with the plurality of soft token prompts comprises:
fusing, through an attention mechanism in the sentence encoder, the plurality of soft token prompts with context information from the input text.

12. The system of claim 10, wherein an operation of the encoding is performed by:
projecting an original dimension of the plurality of soft token prompts to a lower dimensional space;
encoding the projected plurality of soft token prompts in the lower dimensional space through two transformer encoder layers of the lower dimension; and
projecting the encoding from the lower dimensional space to the original dimension.

13. The system of claim 10, wherein the nearest neighbors are determined based on computing an Euclidean distance between the respective contextualized representation and each codebook vector in the contextualized space.

14. The system of claim 11, wherein the nearest neighbors are obtained from multinomial sampling based on computed Euclidean distances.

15. The system of claim 10, wherein the set of codebook vectors are trainable.

16. The system of claim 10, wherein the plurality of soft token prompts are trainable.

17. The system of claim 10, wherein the operations further comprise:
computing a training objective comprising the cross-entropy loss between the output label and a ground-truth label and a prompt loss component, wherein the prompt loss component is computed by a difference between the contextualized representations and a stop gradient of the quantized representations, and
updating the sentence encoder and the vector quantizer based on the training objective while freezing parameters of the pre-trained language model.

18. A non-transitory processor-readable medium storing a plurality of processor-executable instructions for generating vector-quantized input-contextualized soft prompts for natural language understanding, the instructions being executed by one or more processors to perform operations comprising:
receiving an input text and a plurality of soft token prompts;
encoding, via a sentence encoder, the input text prepended with the plurality of soft token prompts into contextualized representations;
generating, via a vector quantizer, quantized representations from the contextualized representations by taking an average over samples obtained from multinomial sampling in a contextualized space;
adding quantized tokens corresponding to the quantized representations to the plurality of soft tokens to generate final soft prompt tokens;
concatenating the input text with the final soft prompt tokens to form a model input; and
generating, by a pre-trained language model, an output label corresponding to the input text in response to the model input, wherein an operation of the generating, via the vector quantizer, quantized representations comprises:

retrieving, by the vector quantizer, a set of codebook vectors;

determining, for each contextualized representation, a subset of codebook vectors that are nearest neighbors to the respective contextualized representation in a contextualized space; and computing an average of the subset of codebook vectors as a corresponding quantized representation for the respective contextualized representation.

19. The non-transitory processor-readable medium of claim 18, wherein the encoding, via a sentence encoder, the input text prepended with the plurality of soft token prompts comprises:

fusing, through an attention mechanism in the sentence encoder, the plurality of soft token prompts with context information from the input text.

20. The non-transitory processor-readable medium of claim 18, wherein the encoding is performed by:

projecting an original dimension of the plurality of soft token prompts to a lower dimensional space;

encoding the projected plurality of soft token prompts in the lower dimensional space through two transformer encoder layers of the lower dimension; and projecting the encoding from the lower dimensional space to the original dimension.

* * * * *